(12) United States Patent
Sen et al.

(10) Patent No.: US 10,823,184 B2
(45) Date of Patent: Nov. 3, 2020

(54) ENGINE WITH FACE SEAL

(71) Applicant: General Electric Company, Schenectady, NY (US)

(72) Inventors: Arnab Sen, Bangalore (IN); Mohamed Musthafa Thoppil, Bangalore (IN); Nathan Evan McCurdy Gibson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 702 days.

(21) Appl. No.: 15/221,962

(22) Filed: Jul. 28, 2016

(65) Prior Publication Data
US 2018/0030986 A1    Feb. 1, 2018

(51) Int. Cl.
| F01D 11/02 | (2006.01) |
| F04D 27/00 | (2006.01) |
| F01D 11/04 | (2006.01) |
| F16J 15/34 | (2006.01) |
| F01D 5/02 | (2006.01) |
| F01D 9/02 | (2006.01) |
| F01D 11/00 | (2006.01) |
| F01D 25/10 | (2006.01) |
| F04D 29/056 | (2006.01) |
| F04D 29/32 | (2006.01) |
| F04D 29/54 | (2006.01) |

(52) U.S. Cl.
CPC ............. *F04D 27/002* (2013.01); *F01D 5/02* (2013.01); *F01D 9/02* (2013.01); *F01D 11/001* (2013.01); *F01D 11/025* (2013.01); *F01D 11/04* (2013.01); *F01D 25/10* (2013.01); *F04D 29/056* (2013.01); *F04D 29/321* (2013.01); *F04D 29/541* (2013.01); *F16J 15/342* (2013.01); *F05D 2220/323* (2013.01); *F05D 2240/55* (2013.01); *F05D 2260/20* (2013.01)

(58) Field of Classification Search
CPC .... F04D 27/002; F04D 29/056; F04D 29/321; F04D 29/541; F01D 5/02; F01D 9/02; F01D 11/001; F01D 11/025; F01D 11/04; F01D 25/10; F16J 15/342; F05D 2220/323; F05D 2240/55; F05D 2260/20
See application file for complete search history.

(56) References Cited

U.S. PATENT DOCUMENTS

| 593,277 A | 11/1897 | Mitchell |
| 2,831,653 A | 4/1958 | Alford |
| 3,516,757 A * | 6/1970 | Baumann ............... F03B 11/006 415/1 |

(Continued)

OTHER PUBLICATIONS

International Search Report and Written Opinion issued in connection with corresponding PCT Application No. PCT/US2017/042028 dated Sep. 28, 2017.

*Primary Examiner* — Aaron R Eastman
*Assistant Examiner* — Theodore C Ribadeneyra
(74) *Attorney, Agent, or Firm* — Dority & Manning, P.A.

(57) ABSTRACT

A turbine engine with a stator having axially spaced first and second structural elements along with a rotor and a face seal between the rotor and the stator including a non-rotating gas bearing face coupled to the first and second structural elements, and a rotating gas bearing face coupled to the rotor and confronting the non-rotating gas bearing surface. Introducing airflow to one or multiple parts of the seal.

20 Claims, 6 Drawing Sheets

(56) References Cited

U.S. PATENT DOCUMENTS

| | | | |
|---|---|---|---|
| 3,606,349 A * | 9/1971 | Petrie et al. | F01D 11/025 |
| | | | 277/414 |
| 4,344,736 A | 8/1982 | Williamson | |
| 4,725,206 A * | 2/1988 | Glaser | F01D 25/125 |
| | | | 415/175 |
| 5,284,347 A | 2/1994 | Pope | |
| 5,975,537 A * | 11/1999 | Turnquist | F16J 15/443 |
| | | | 277/411 |
| 6,595,741 B2 | 7/2003 | Briesenick et al. | |
| 6,676,369 B2 | 1/2004 | Brauer et al. | |
| 6,719,296 B2 * | 4/2004 | Brauer | F01D 11/003 |
| | | | 277/409 |
| 6,758,477 B2 | 7/2004 | Brauer et al. | |
| 7,296,415 B2 | 11/2007 | Coulon et al. | |
| 7,780,399 B1 * | 8/2010 | Garrison | F01D 25/183 |
| | | | 277/400 |
| 8,109,716 B2 | 2/2012 | Glahn et al. | |
| 8,109,717 B2 | 2/2012 | Glahn et al. | |
| 8,167,545 B2 | 5/2012 | Glahn et al. | |
| 8,753,014 B2 * | 6/2014 | Devitt | F16C 32/0618 |
| | | | 384/138 |
| 9,291,067 B2 * | 3/2016 | Zheng | F01D 11/003 |
| 9,683,451 B2 * | 6/2017 | Sonokawa | F01D 11/003 |
| 2004/0007823 A1 * | 1/2004 | Brauer | F01D 11/003 |
| | | | 277/421 |
| 2008/0018054 A1 | 1/2008 | Herron et al. | |
| 2008/0310953 A1 | 12/2008 | Garrison | |
| 2014/0300057 A1 | 10/2014 | O'Brien | |
| 2015/0275690 A1 | 10/2015 | McCaffrey | |

* cited by examiner

ENGINE WITH FACE SEAL

BACKGROUND OF THE INVENTION

Turbine engines, and particularly gas or combustion turbine engines, are rotary engines that extract energy from a flow of combusted gases passing through the engine onto a multitude of rotating turbine blades. The engine includes a plurality of rotating parts forming a rotor and a plurality of stationary parts forming the stator. Seals are necessary between the two parts to prevent leakage and promote flow in the necessary directions.

Aspirating face seals are used to minimize leakage through a gap between two components and from a higher pressure area to a lower pressure area. Aspirating face seals are designed to minimize leakage of a fluid such as compressed air or combustion gases between a rotor and a stator in gas turbine engines. Aspirating face seals may facilitate compensating for transient variations that may exist in gaps between components. Aspirating face seals control fluid leakage in the engine by restricting fluid flow from areas of higher pressure to areas of lower pressure and be positioned between an engine stationary member and a rotating member within the engine.

Fluid leakage through gas turbine engine seal assemblies may significantly increase fuel consumption and adversely affect engine efficiency. Additionally, fluid leakage may cause damage to other components and/or increase overall engine maintenance costs. It is therefore desirable to increase specific fuel consumption whenever possible.

The aspirating face seal is a technology that can reduce leakage. This seal relies on small and well controlled clearances between the non-rotating and rotating members to function reliably. Because of extreme temperature variations, coning can occur where the non-rotating and rotating members meet, which affects the clearance. It would therefore be beneficial to decrease any coning occurring, increasing specific fuel consumption (SFC) and the life of the parts that form the aspirating face seal.

BRIEF DESCRIPTION OF THE INVENTION

In one aspect, embodiments relate to a turbine engine comprising a stator having axially spaced first and second structural elements, which can be named as forward and aft crossbars a rotor, a face seal between the rotor and the stator comprising a non-rotating gas bearing face coupled to the first and second structural elements, and a rotating gas bearing face coupled to the rotor and confronting the non-rotating gas bearing surface, and an airflow circuit flowing air in contact with either of the first and second structural elements to operationally equalize a transient thermal response of the first and second structural elements to minimize the thermal distortion and maintain a more constant gap between the rotating and non-rotating bearing surfaces.

In another aspect, embodiments relate to a face seal for a turbine engine comprising a slider having radially spaced crossbars, a non-rotating face seal supported by the crossbars, a rotating face seal confronting the non-rotating face seal, and an airflow circuit flowing air in fluid contact with one of the crossbars to operationally equalize a transient thermal response of the crossbars.

In yet another aspect, embodiments relate to a method of operating an air seal of a turbine engine, the method comprising supplying air to one of two radially spaced crossbars supporting a non-rotating gas face to equalize a transient thermal response between the crossbars.

DESCRIPTION OF EMBODIMENTS OF THE INVENTION

Figure 1:
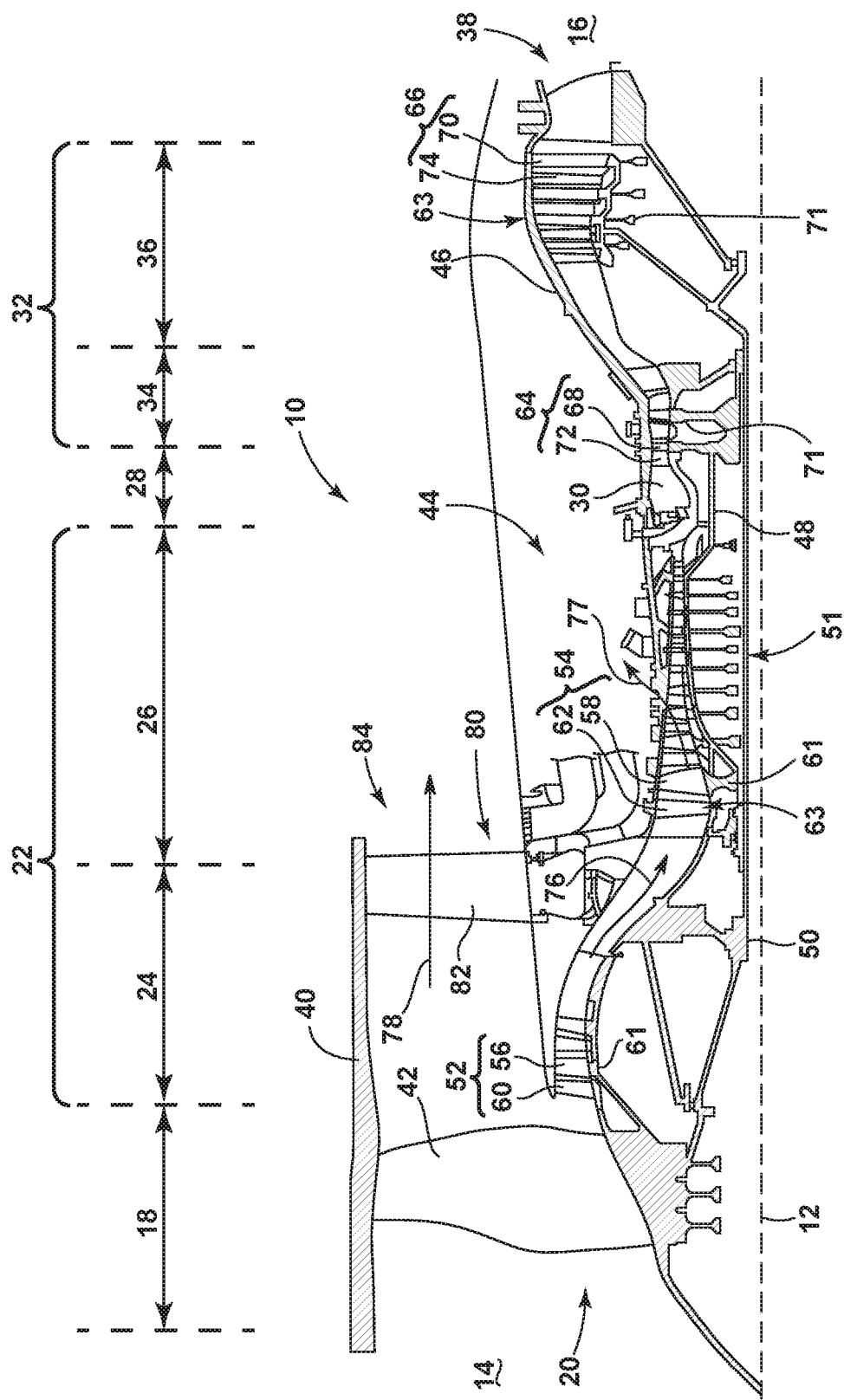
FIG. 1 is a schematic cross-sectional diagram of a turbine engine for an aircraft.

The described embodiments of the present invention are directed to an aspirating face seal, herein referred to as a face seal, having flowing air within at least one of two structural elements of a slider having a non-rotating face of the face seal. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP)

compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
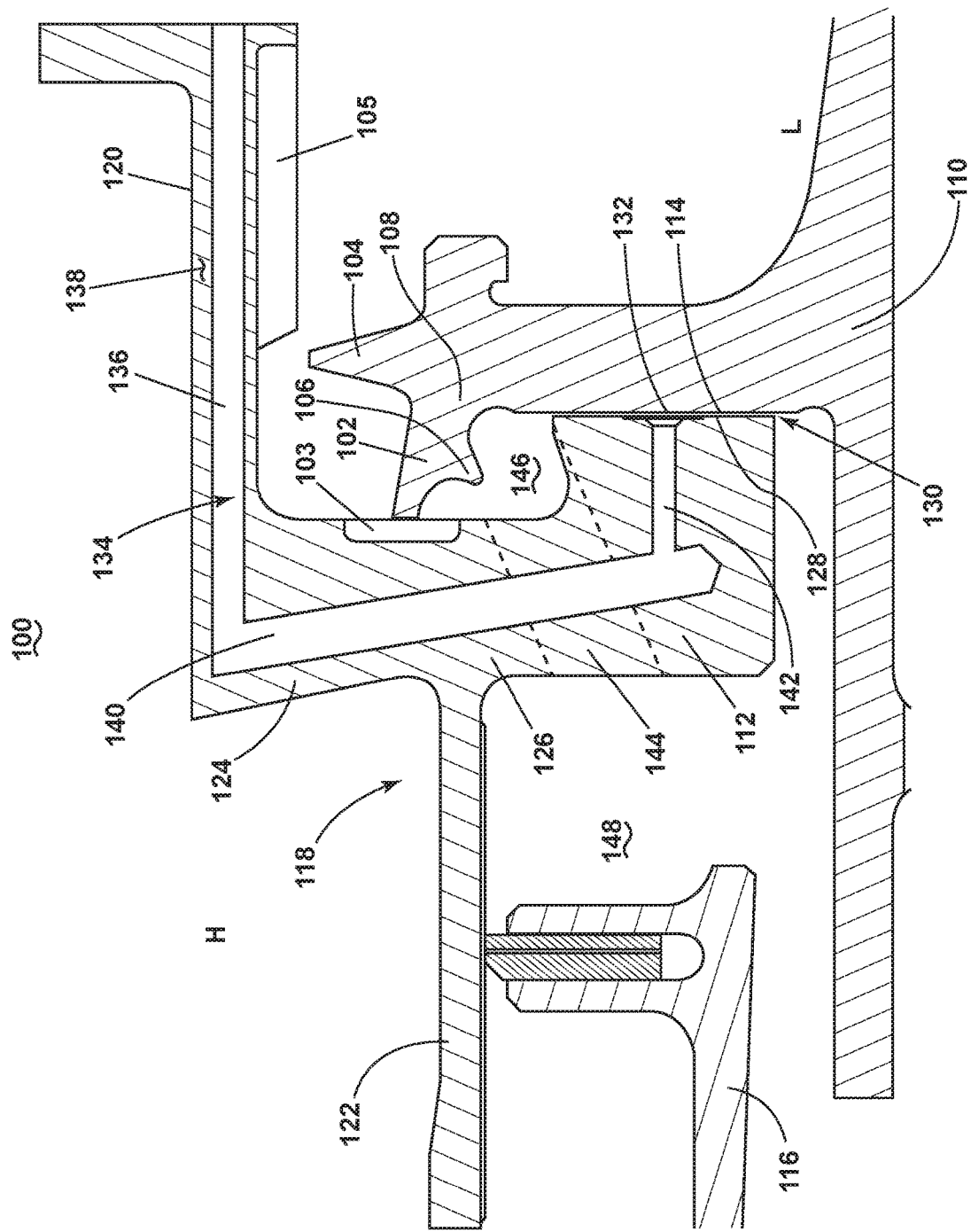
FIG. 2 is face seal formed between a portion of a rotor and a stator of the turbine engine of FIG. 1 when the engine is in a closed position.

FIG. 2 depicts a face seal 100 between the rotor 51 and the stator 63. Primary 102, starter 104, and deflector 106 seal teeth together form a seal tooth 108 extending radially outward from a rotatable member 110 of the rotor 51. The primary and starter teeth 102, 104 form an annular labyrinth seal tooth to engage corresponding primary and starter seal lands 103, 105 on a non-rotatable member 112 at corresponding points of operation. A circumferential rotating bearing face 114 is formed with the rotatable member 110 and the seal tooth 108.

The stator 63 comprises a stator arm 116 to which a slider 118 is axially and slidingly mounted. The slider 118 has first and second structural elements comprising crossbars 120, 122 to support radially spaced portions 124, 126 of a circumferential non-rotating gas bearing face 128 adjacent to and radially inward of the primary tooth 102. The non-rotating gas bearing face 128 confronts the rotating gas bearing face 114 wherein a bearing gap 130 is formed between the confronting bearing faces 114, 128.

The starter tooth 104 creates a closing force when the engine is first turned on. The gap between the primary tooth 102 and land 103 is greater than the starter tooth 104 and land 105 gap when started (not shown). In this opened condition almost all pressure drop occurs across the starter tooth 104, while very little occurs across the primary tooth 102. The pressure drop across the starter tooth 104 causes the seal to close.

The primary tooth 102 provides sealing when the engine is running and in a closed position as shown. In this case the gap between the primary tooth 102 and land 103 is less than the gap between the starter tooth 104 and land 105. Almost all the pressure drop occurs across the primary tooth 102 and very little occurs across the starter tooth 104.

During operation high pressure and low pressure differentials between an area with relatively high pressure H surrounding the crossbars 120, 122 and an area with relatively lower pressure L proximate the bearing gap 130 create an air film within the bearing gap 130. This air film provides a low friction sliding surface 132 for smooth rotation of the rotating gas bearing face 114 next to but not touching the non-rotating gas bearing face 128.

An airflow circuit 134 comprising at least one conduit 136 formed within an interior 138 of the crossbar 120 includes an inclined feed hole 140 and an air bearing feed hole 142. The airflow circuit 134 can comprise multiple conduits 136 passing through the non-rotating gas bearing face 128 forming an annular airflow circuit 134 flowing air in contact with the crossbar 120. Additionally, a vent hole 144 can fluidly connect an area 146 proximate the primary tooth 102 to a vent cavity 148 axially adjacent the stator arm 116.

The rotor 51 and stator 63 include, but are not limited to, the rotatable and non-rotatable members 110, 112, the crossbars 120, 122, the slider 118, and the seal tooth 108. These parts will be collectively referred to as "components" in discussing FIG. 3 and can be formed from steel or other materials having thermal expansion properties.

Figure 3:
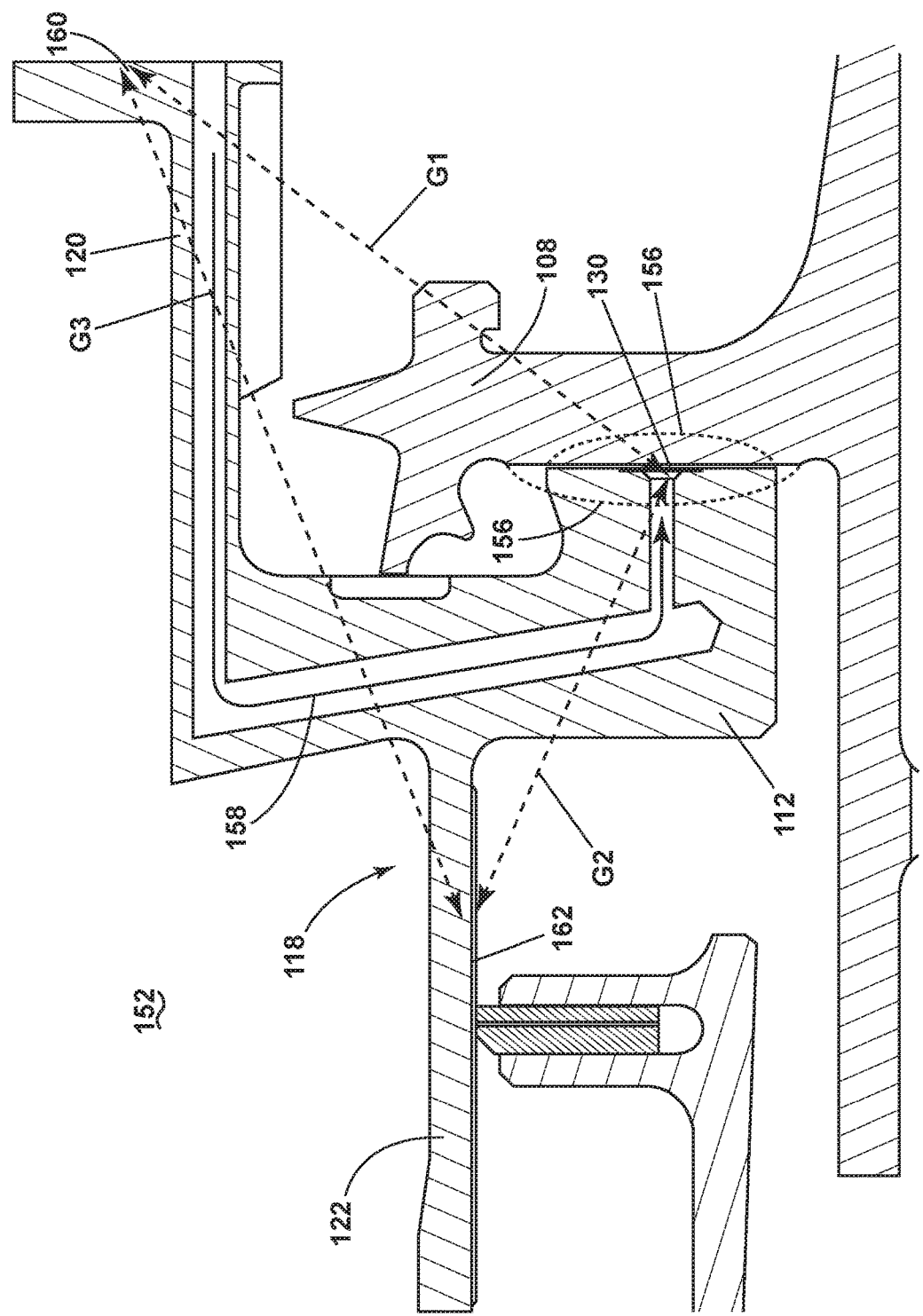
FIG. 3 is the face seal from FIG. 2 with gradients.

Turning to FIG. 3, during operation transient temperature conditions exist where temperatures of the components can vary along gradients G1, G2, and G3. It is desirable to bring all of these varying temperatures to the same temperature at the same time, referred to herein as the thermal response rate. In an environment with transient temperature conditions, a strategic placement of air can increase or decrease the thermal response rate at specific locations as needed along the gradients G1, G2, and G3. Introducing air as an airflow near or surrounding these components can ensure that the thermal response rate for different locations along the gradients G1, G2, and G3 have similar magnitudes.

The gradient G1 spans an area at an axial end 160 of crossbar 120 to the bearing gap 130 and gradient G2 continues from the bearing gap to a point 162 on crossbar 122. The gradient G3 is a resultant of G1 and G2, spanning the area from the axial end 160 to the point 162. While all of the gradients G1, G2, and G3 affect the amount of bowing or bending, the resultant gradient G3, in this particular embodiment, is considered the most critical because it spans the largest portion of the slider 118. Therefore the largest transient temperature differences are occurring along G3. It should be understood that differences along any of the gradients G1, G2, and G3, along with other gradients not discussed but understood to exist, are also contemplated and the transient temperature differences along G3 are exemplary and not meant to be limiting.

Depending on the location along gradient G1, G2, or G3, the thermal response rate can vary significantly. The thermal response rate is dependent on a plurality factors including the thermal conductivity, the amount of heat per unit time per unit area that can be conducted through a given amount of a material, the initial temperature of the material, and the temperature of the surrounding air. In the absence of introducing an airflow, the thermal response rates will vary significantly which can result in bowing and bending in the components.

The bowing or bending of the components can produce a coning effect 156 when either one of the non-rotating gas bearing face 128 and the rotating gas bearing face 114 bow out producing a cone-shape. For example if crossbar 122 is cooler than crossbar 120 then the G2 gradient is lower than G1. This causes a differential pull on the circumferential non-rotating gas bearing face 128 causing it to distort, in this example causing it to bend in a counterclockwise direction when looking at the cross section as depicted in FIG. 3. This causes the lower end of the circumferential non-rotating gas bearing face 128 to move towards the rotating gas bearing face 114. In another example, where crossbar 122 is hotter than crossbar 120 a distortion in the opposite direction can occur. In either case there is a reduction of the minimum bearing gap 130 clearance, increasing the likelihood that the two bearing faces 114, 128 will contact and wear on each other. It is therefore desirable to regulate the thermal response rate in order to control the coning effect 156.

Flowing air 158 in the airflow circuit 134 alters the thermal transient rate in crossbars 120 and 122. By adjusting the airflow 158 to achieve the desired thermal response rate for the respective locations 160, 162 and those therebetween, the temperature gradients G1, G2, G3 can be controlled to produce acceptable levels of bearing face coning.

When operating conditions cause the components to be hotter than the surrounding air 152, it is desirable to bring the temperature gradients G1, G2, G3 to an equilibrium, where the temperature differences $\Delta T$ along the gradients within the components are as close to zero as possible. Flowing air 158 through the conduit 136 in the crossbar 120 operationally equalizes a transient thermal response for the first and second structural elements 120, 122, bringing $\Delta T$ as close to zero as possible, and decreasing or eliminating the aforementioned coning effect 156. Therefore, preventing contact between the rotating and non-rotating surfaces 114, 128.

Figure 4:
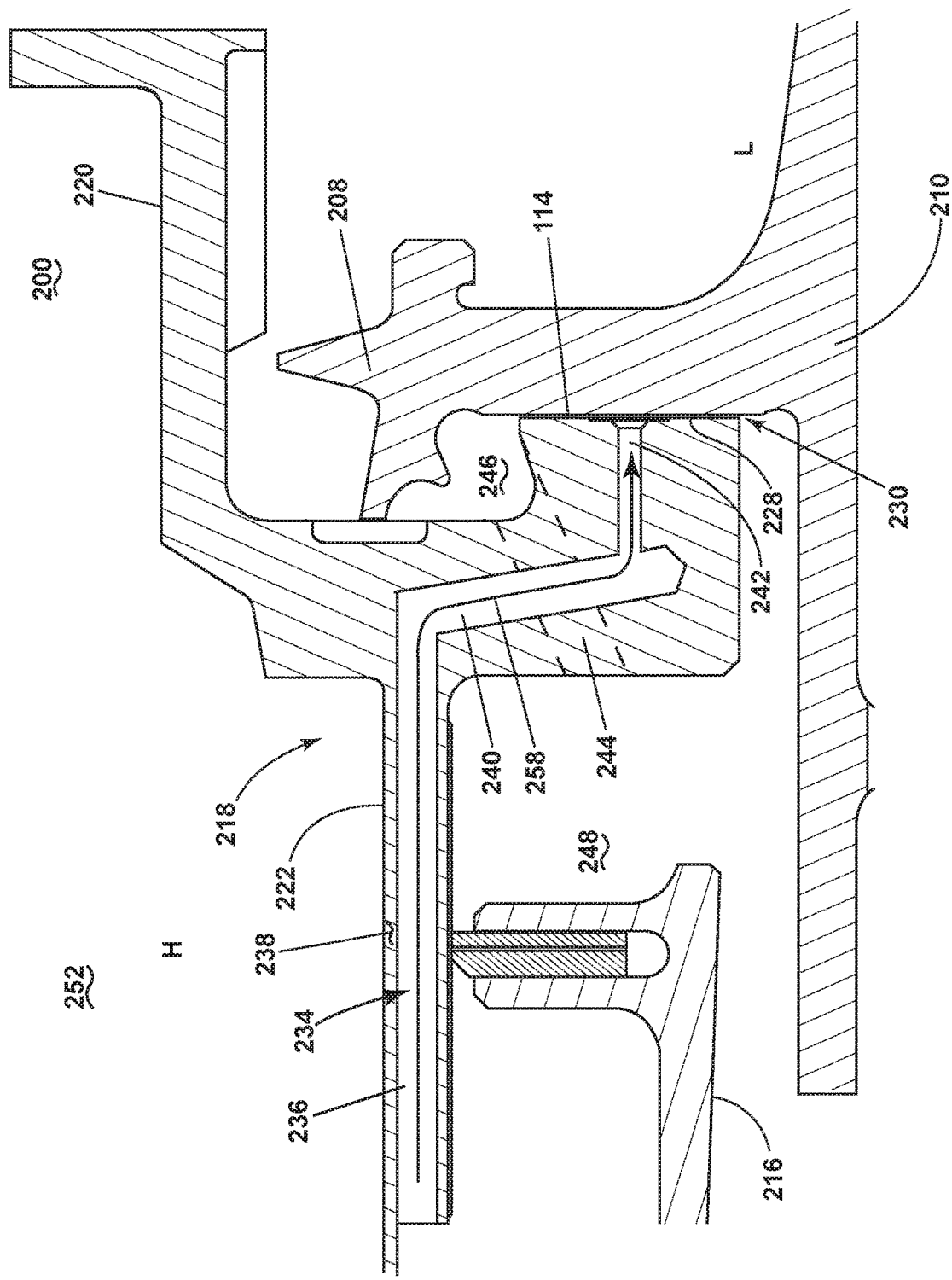
FIG. 4 is a second embodiment of the face seal of FIG. 2.
Figure 5:
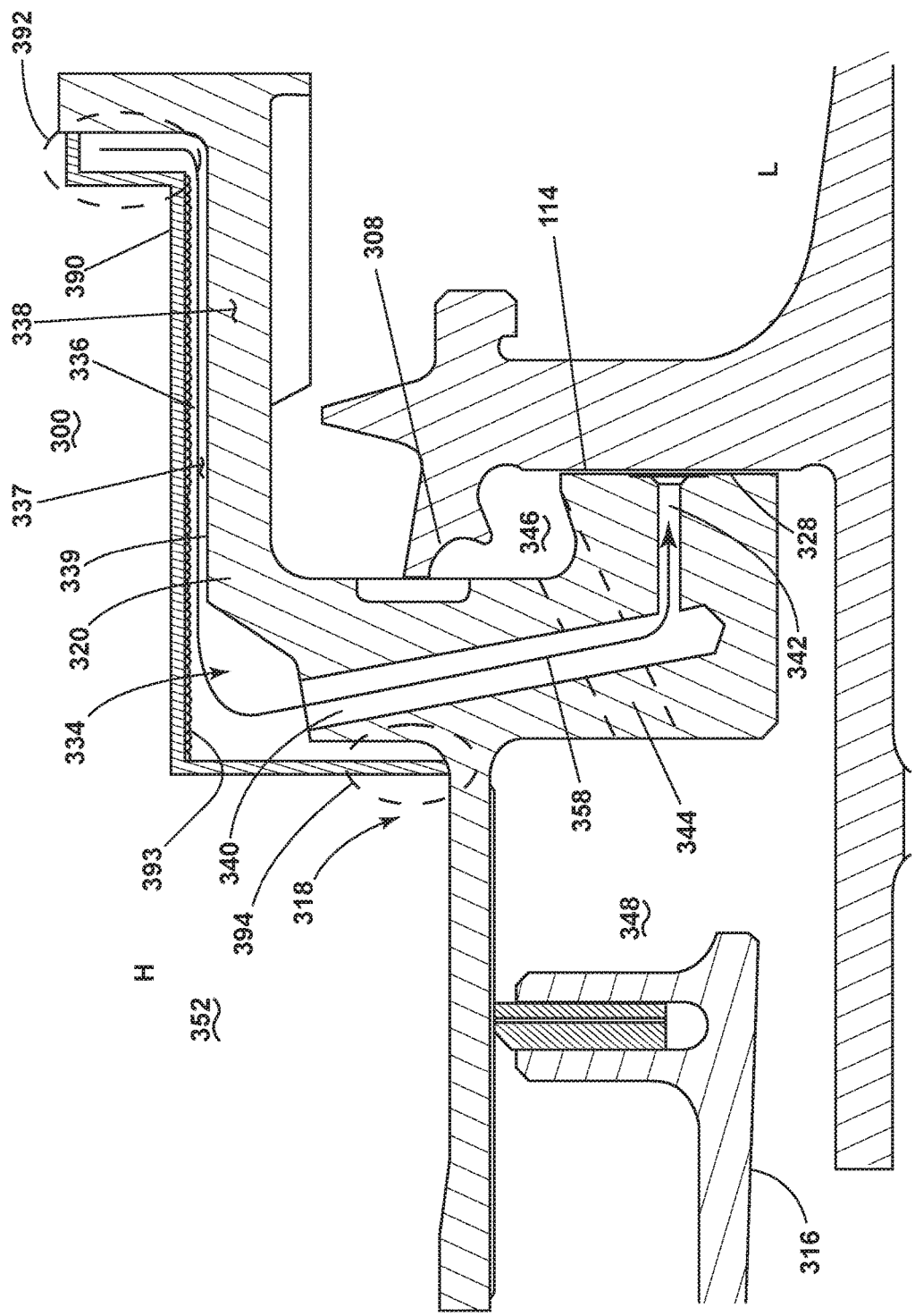
FIG. 5 is a third embodiment of the face seal of FIG. 2.
Figure 6:
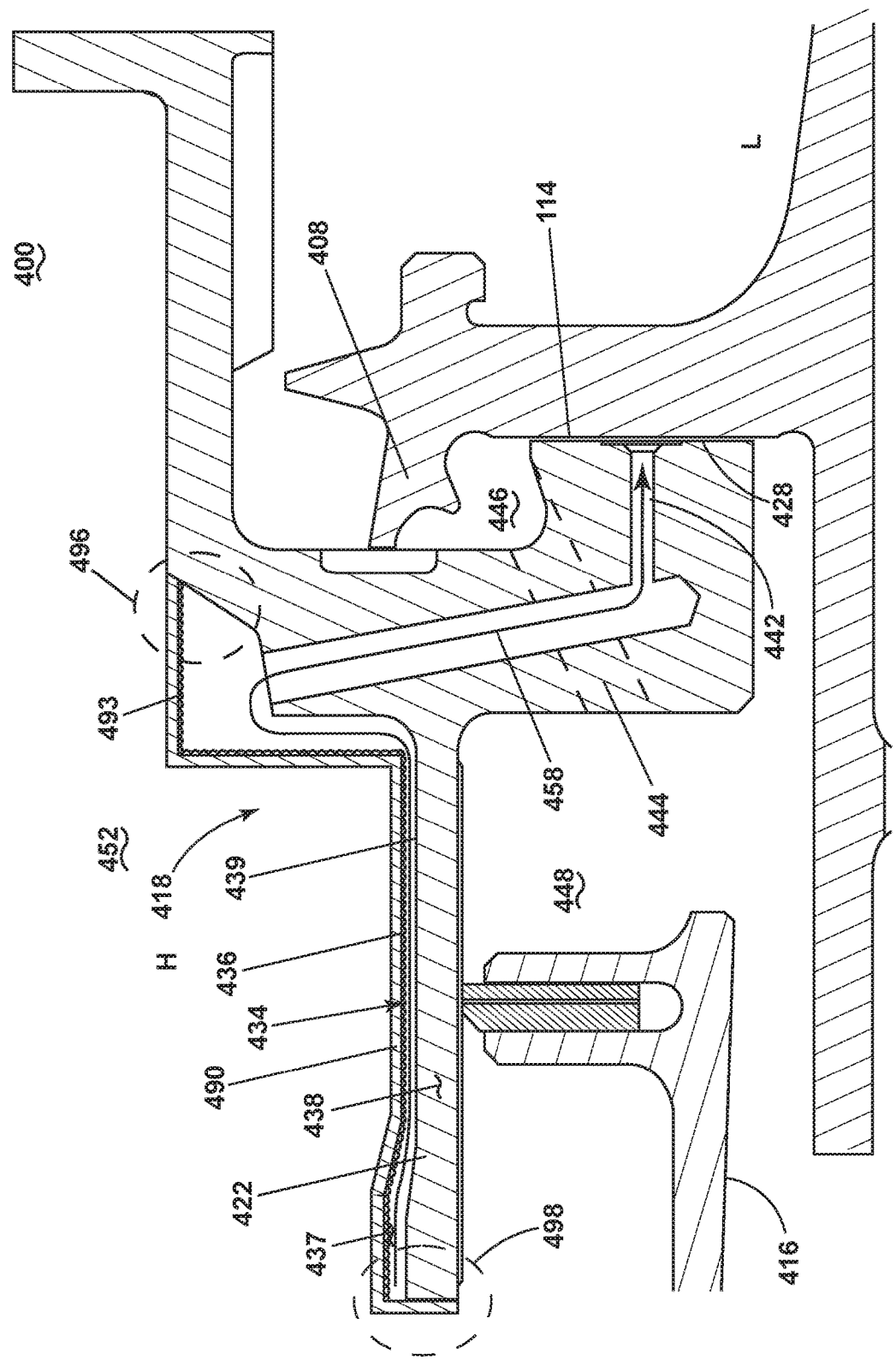
FIG. 6 is a fourth embodiment of the face seal of FIG. 2.

Turning to FIGS. 4, 5 and 6, similar alternative embodiments are illustrated with like parts identified by like numerals increasing by 100, with it being understood that the description of the like parts of the first embodiment applies to the additional embodiment, unless otherwise noted.

FIG. 4 illustrates a slider 218 having a conduit 236 formed in a second structural element comprising a crossbar 222. Much like the first embodiment discussed herein, the conduit 236 is formed in an interior 238 of the crossbar 222. In a case where forward crossbar 222 responds more slowly to changes in temperature of the surrounding air 252 than aft crossbar 220, it is desirable to provide flowing air 258 in the cross bar 222. This increases the transient thermal response of forward crossbar 222 and minimizes gradient G3 resulting in lower thermally induced coning at bearing gap 230.

FIG. 5 illustrates a third embodiment with the same function as the first embodiment of FIG. 2 where a conduit 336 is formed on an exterior 339 of a crossbar 320 with a metal plate 390 that can be brazed, welded, or otherwise attached to a first and second portion 392, 394 of a slider 318. Turbulators 393 can be provided within the conduit 336 to enhance heat transfer by inducing a more turbulent flow. A gap space 337 between the metal plate 390 and the exterior 339 can be formed based on pressure drop and the desired transient thermal response.

FIG. 6 illustrates a fourth embodiment having the same function as the second embodiment of FIG. 5 and structurally similar to the third embodiment of FIG. 6. A metal plate 490 can be brazed to a third 496 and fourth portion 498 of a slider 418 to form a conduit 436 for flowing air 458 across an exterior 439 of a second structural element comprising a crossbar 422. Turbulators 493 can be provided within the conduit 436 to enhance heat transfer by inducing a more turbulent flow. A gap space 437 between the metal plate 490 and the exterior 439 can be formed based on pressure drop and the desired transient thermal response.

A method of operating the face seal 100 comprises supplying air 158 to one of the two radially spaced crossbars 120, 122 that support the non-rotating gas face 128 to equalize the transient thermal response between the crossbars 120, 122. Supplying the air 158 comprises supplying cooling air to the hotter of the one of the crossbars 120, 122 or supplying the air comprises supplying hotter air to the cooler of the one of the crossbars 120, 122.

Analysis performed during different points of operation showed significant improvements in decreasing temperature differences ΔT. Benefits during burst and reburst operations were greater than those during a steady state operation. Temperature differences ΔT during steady state operation were found to be closer to zero both before and after implementing flowing air 158 in conduit 136, hence the smaller gradient benefit for steady state operation.

Along with the benefits described herein the face seal 100 reduces thermal gradient induced coning, reduces pressure coning, includes a form that is easy to manufacture and reduces distortion. This reduced distortion allows the seal to be designed to have a smaller air bearing gap 130 which allows a corresponding reduction in clearance between the primary tooth 102 and primary tooth land 103. During engine operation the primary seal is the main restriction on flow so a reduction in clearance results in lower seal flow.

It should be appreciated that application of the disclosed design is not limited to turbine engines with fan and booster sections, but is applicable to turbojets, turboprops, turboshafts and other turbomachinery, such as compressors or steam turbines, as well. It should also be further appreciated that while embodiments described herein have a given orientation the embodiments can be positioned in other directions and/or orientations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
a stator having a stator arm to which a slider is axially and slidingly mounted, the slider having radially spaced first and second structural elements each extending axially and having a first axial end and a second axial end, such that the first axial ends of the first and second structural elements are proximal to one another and the second axial ends of the first and second structural elements are distal to one another;
a rotor;
a face seal between the rotor and the stator comprising a non-rotating gas bearing face having radially spaced portions which are coupled to and supported by the first axial ends of the first and second structural elements, and a rotating gas bearing face coupled to the rotor and confronting the non-rotating gas bearing face; and
an airflow circuit flowing air axially within one of the first and second structural elements to operationally equalize a transient thermal response of the first and second structural elements and create an air film to prevent contact between the rotating and non-rotating bearing faces.

2. The turbine engine of claim 1 wherein the airflow circuit passes through the non-rotating gas bearing face.

3. The turbine engine of claim 1 wherein the airflow circuit comprises a conduit formed with one of the first and second structural elements.

4. The turbine engine of claim 3 wherein the conduit is formed on an exterior of the one of the first and second structural elements.

5. The turbine engine of claim 3 wherein the conduit is formed on an interior of the one of the first and second structural elements.

6. The turbine engine of claim 1 wherein the slider has the first and second structural elements supporting the non-rotating gas bearing face, and the airflow circuit passes through the non-rotating gas bearing face to provide gas between the rotating and non-rotating gas bearing faces.

7. The turbine engine of claim 6 wherein the non-rotating gas bearing face is circumferential and the first and second structural elements comprise crossbars supporting radially spaced portions of the non-rotating gas bearing face.

8. The turbine engine of claim 7 wherein the airflow circuit comprises multiple conduits passing through the non-rotating gas bearing face.

9. The turbine engine of claim 8 wherein the multiple conduits pass along an exterior of one of the crossbars.

10. The turbine engine of claim 8 wherein the multiple conduits pass through one of the crossbars.

11. The turbine engine of claim 1 wherein the rotor comprises a seal tooth adjacent the non-rotating gas bearing face.

12. A face seal for a turbine engine comprising:
a slider axially and slidingly mounted on a stator arm and having radially spaced crossbars each extending axially and having a first axial end and a second axial end, such that the first axial ends of the first and second crossbars are proximal to one another and the second axial ends of the first and second crossbars are distal to one another;
a face seal comprising a non-rotating bearing face having radially spaced portions which are coupled to and supported by the crossbars;
a rotating bearing face confronting the non-rotating bearing face and spaced therefrom to define a bearing gap; and
an airflow circuit defining an axial passage within at least one of the radially spaced crossbars and through which air is supplied to operationally equalize a transient thermal response of the crossbars and create an air film to prevent contact between the rotating and non-rotating bearing faces.

13. The face seal of claim 12 wherein the airflow circuit passes through the non-rotating face seal.

14. The face seal of claim 13 wherein the airflow circuit comprises a conduit formed with one of the crossbars.

15. The face seal of claim 14 wherein the conduit is formed on an exterior of the one of the crossbars.

16. The face seal of claim 14 wherein the conduit is formed on an interior of the one of the crossbars.

17. The face seal of claim 14 wherein a seal tooth is located adjacent the non-rotating face seal.

18. A method of operating an air seal of a turbine engine, the method comprising:
supplying air axially into one of two radially spaced crossbars of a slider which is axially and slidingly mounted on a stator arm, the crossbars each extending axially and having a first axial end and a second axial end, such that the first axial ends of the crossbars are proximal to one another and the second axial ends of the crossbars are distal to one another, the first axial ends of the crossbars supporting a non-rotating gas bearing face having radially spaced portions coupled to and supported by the crossbars and confronting a rotating gas bearing face, to equalize a transient thermal response between the crossbars and create an air film to prevent contact between the rotating and non-rotating bearing faces.

19. The method of claim 18 wherein supplying the air comprises supplying cooling air to a hotter of the one of the crossbars.

20. The method of claim 18 wherein supplying the air comprises supplying air to a cooler of the one of the crossbars.

\* \* \* \* \*